(12) United States Patent
Byrd

(10) Patent No.: US 9,098,954 B1
(45) Date of Patent: Aug. 4, 2015

(54) PORTABLE SELF-CONTAINED TOTALLY INTEGRATED ELECTRONIC SECURITY AND CONTROL SYSTEM

(71) Applicant: LEXORCOM, LLC, San Angelo, TX (US)

(72) Inventor: Scott Randall Byrd, San Angelo, TX (US)

(73) Assignee: LEXORCOM, LLC, San Angelo, TX (US)

( * ) Notice: Subject to any disclaimer, the term of this patent is extended or adjusted under 35 U.S.C. 154(b) by 0 days.

(21) Appl. No.: 14/605,923

(22) Filed: Jan. 26, 2015

Related U.S. Application Data

(60) Provisional application No. 61/931,685, filed on Jan. 26, 2014.

(51) Int. Cl.
| | |
|---|---|
| G05B 19/00 | (2006.01) |
| G05B 23/00 | (2006.01) |
| G06F 7/00 | (2006.01) |
| B60R 25/00 | (2013.01) |
| G06K 5/00 | (2006.01) |
| G07C 9/00 | (2006.01) |
| G01S 3/04 | (2006.01) |
| G08B 13/196 | (2006.01) |
| G06K 9/00 | (2006.01) |
| G08B 13/24 | (2006.01) |
| G06K 7/10 | (2006.01) |
| G06Q 10/08 | (2012.01) |
| G06K 17/00 | (2006.01) |
| G06Q 20/20 | (2012.01) |

(52) U.S. Cl.
CPC .............. G07C 9/00111 (2013.01); G01S 3/04 (2013.01); G06K 7/10009 (2013.01); G06K 9/00771 (2013.01); G07C 9/00079 (2013.01); G08B 13/19608 (2013.01); G08B 13/248 (2013.01); G06K 2017/0045 (2013.01); G06Q 10/08 (2013.01); G06Q 10/087 (2013.01); G06Q 20/203 (2013.01); G08B 13/2462 (2013.01)

(58) Field of Classification Search
None
See application file for complete search history.

(56) References Cited

U.S. PATENT DOCUMENTS

| | | | |
|---|---|---|---|
| 6,181,244 B1 | 1/2001 | Hall et al. | |
| 7,193,508 B2 | 3/2007 | Hill et al. | |
| 7,735,728 B2 * | 6/2010 | Wallerstorfer | 235/382 |
| 8,081,074 B2 | 12/2011 | Marshall et al. | |
| 2004/0002894 A1 * | 1/2004 | Kocher | 705/13 |
| 2005/0078006 A1 * | 4/2005 | Hutchins et al. | 340/561 |
| 2009/0032585 A1 * | 2/2009 | Kocznar et al. | 235/382 |
| 2010/0175323 A1 * | 7/2010 | Plaster | 49/70 |
| 2011/0001606 A1 * | 1/2011 | Charych | 340/5.7 |
| 2013/0027187 A1 | 1/2013 | Yepez | |
| 2014/0077927 A1 * | 3/2014 | Mattern | 340/5.7 |
| 2014/0104035 A1 * | 4/2014 | Skonberg et al. | 340/5.3 |

\* cited by examiner

*Primary Examiner* — Ariel Balaoing
*Assistant Examiner* — Mohamed Barakat
(74) *Attorney, Agent, or Firm* — Buskop Law Group, PC; Wendy Buskop

(57) ABSTRACT

A self-contained portable unit with an integral access control and tracking system, which provides a portable, unmanned, entry and access control system. The system for logging tagged assets while simultaneously allowing or denying access to a perimeter area and egress from a perimeter area of vehicular, human and animal traffic. The system monitors and/or records radio frequency identification tagged assets and stops assets with radio frequency identification tags from entering a site unless a login/logout device is used with libraries of login information. The system can generate on-site audible and visual alarms and generate reports on asset movement and non-asset non-tagged movement.

19 Claims, 6 Drawing Sheets

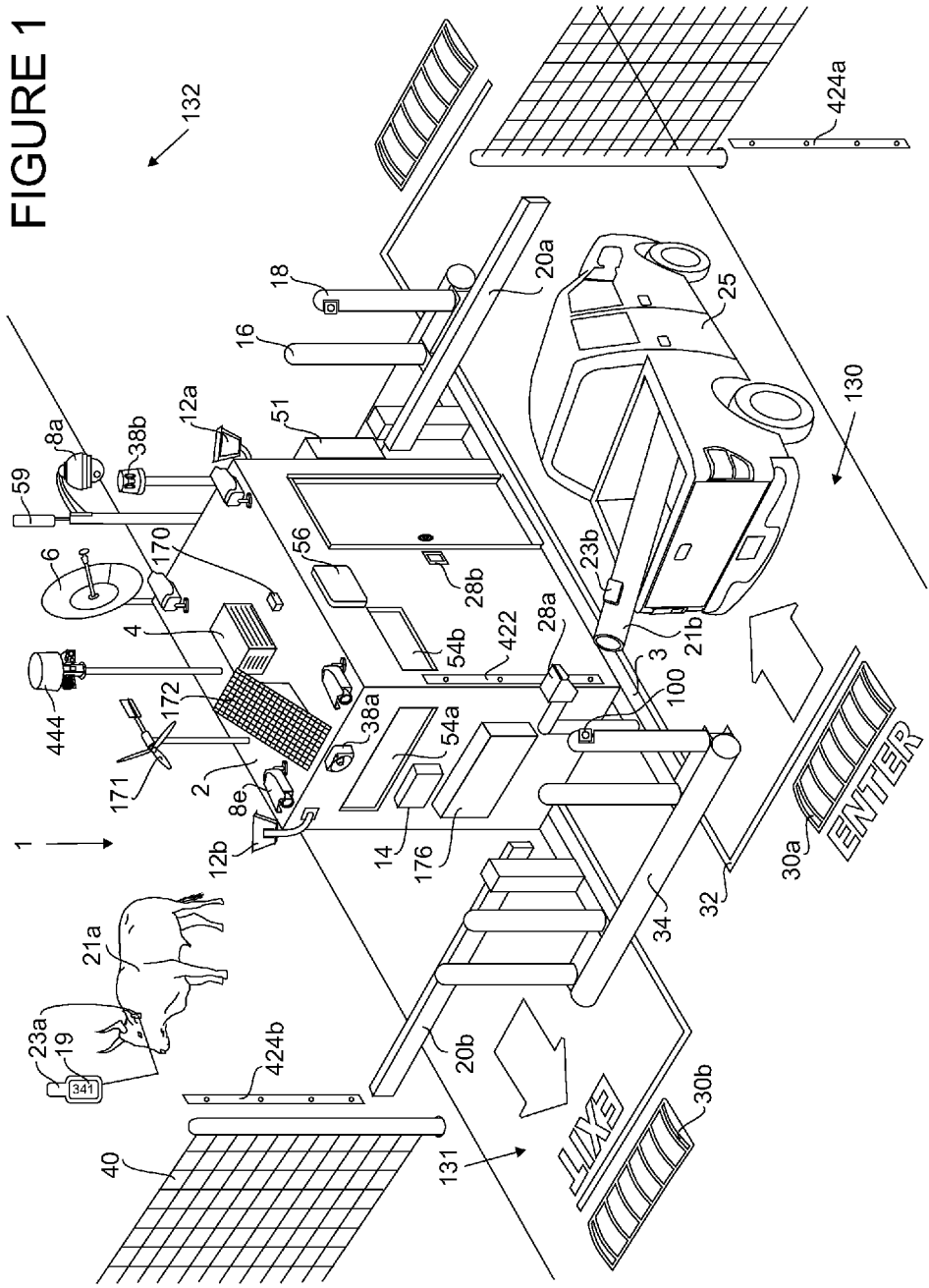

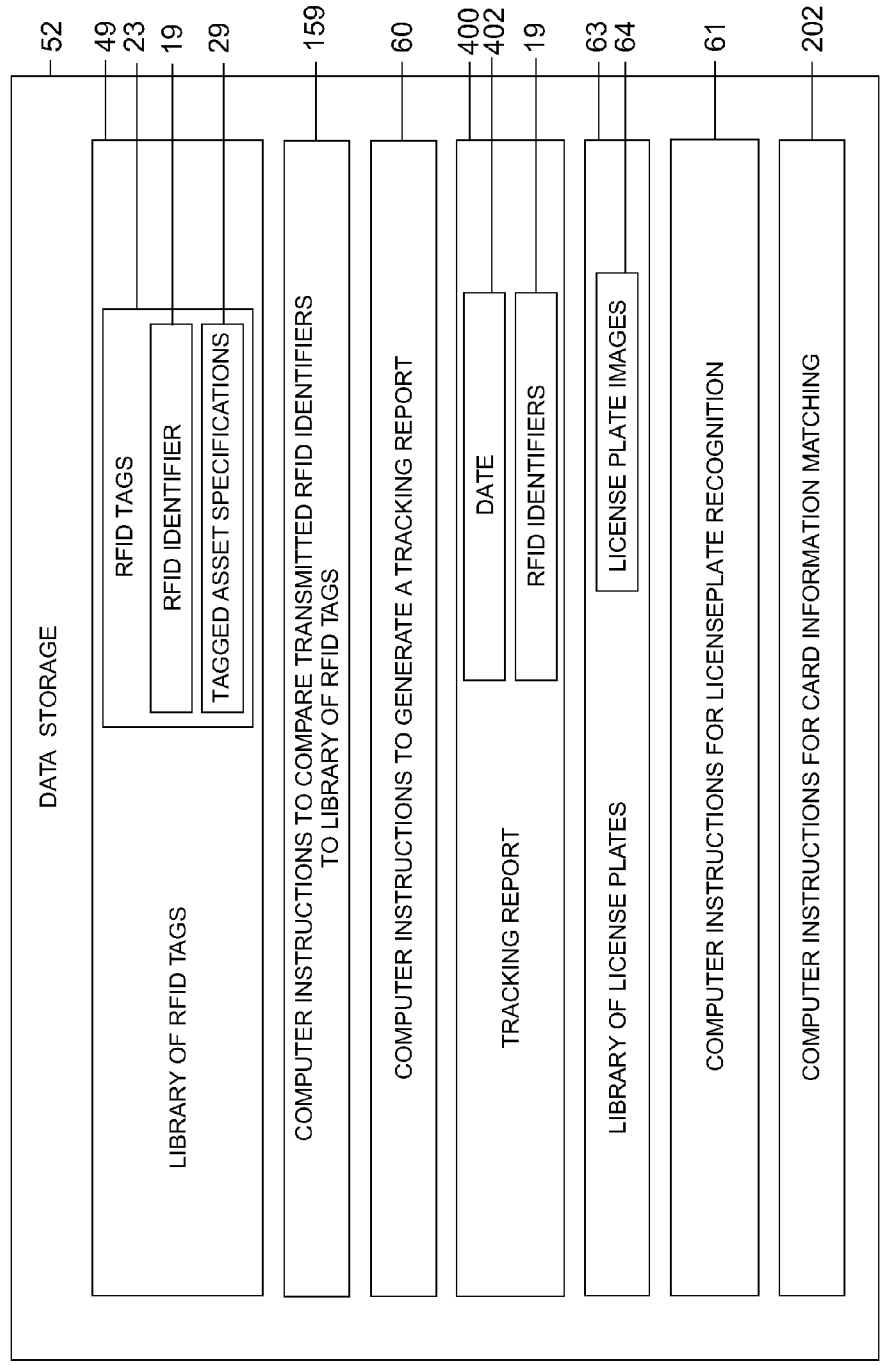

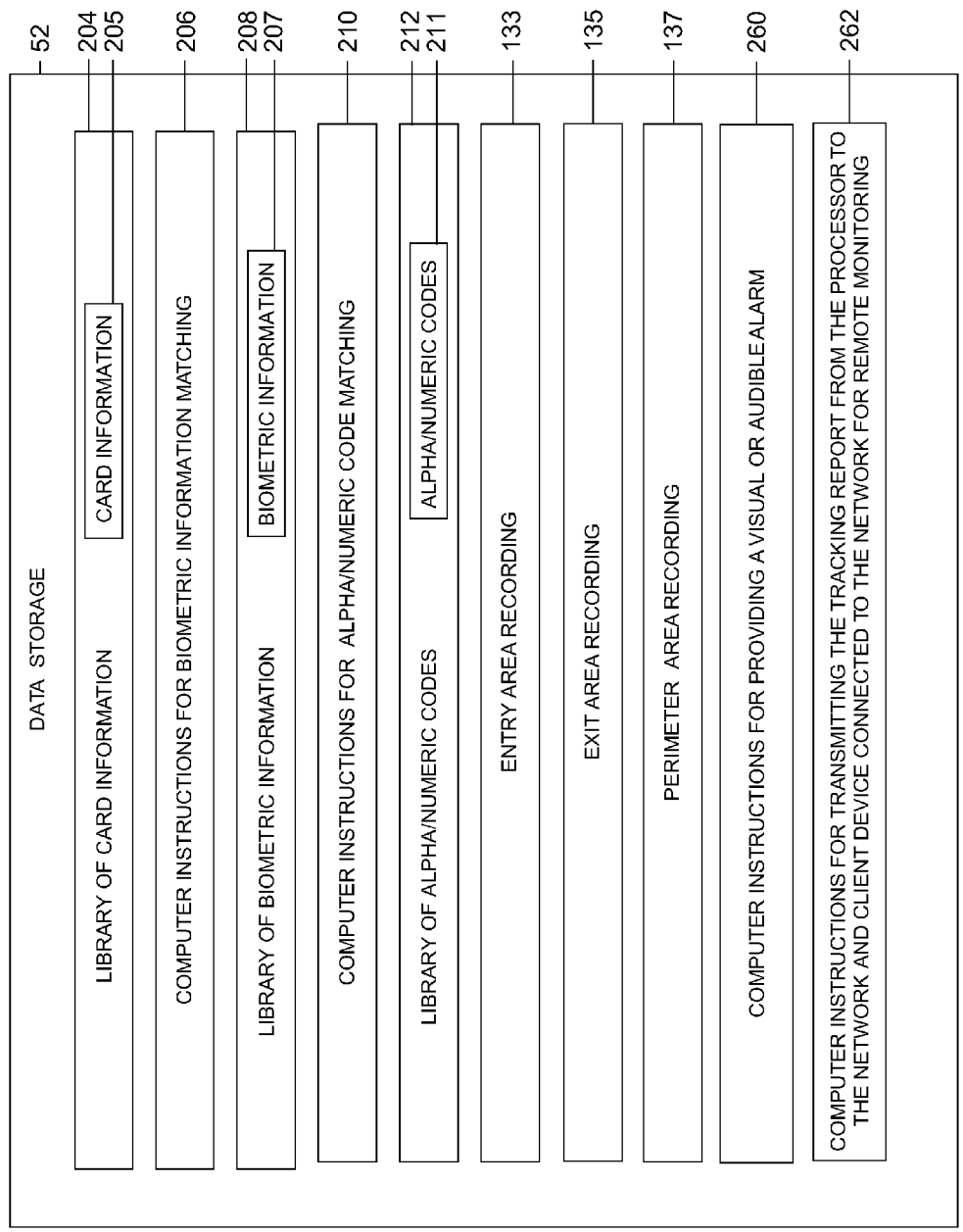

PORTABLE SELF-CONTAINED TOTALLY INTEGRATED ELECTRONIC SECURITY AND CONTROL SYSTEM

CROSS REFERENCE TO RELATED APPLICATION

The current application claims priority to and the benefit of U.S. Provisional Patent Application Ser. No. 61/931,685 filed Jan. 26, 2014, entitled "PORTABLE/MOBILE SELF-CONTAINED TOTALLY INTEGRATED ELECTRONIC SECURITY AND ENTRY CONTROL SYSTEM." This application is incorporated herein in its entirety.

FIELD

The present embodiments generally relate to portable, self-contained, security and entry and access control systems.

BACKGROUND

Industries, such as oil and gas exploration, new construction, terrorism, border security, facilities of various types, and offices of various types, often need temporary security and entry and access control services to be placed at entry/exit points at locations that do not require a permanent installation of a permanently installed system.

Further, construction sites, commercial properties, manufacturing facilities, the US infrastructures, and energy sector are increasingly undergoing vandalism and theft. The vandalism extends to property damage as well as the destruction of construction equipment and building materials. The theft of manufacturing and construction equipment, and building materials is costly to the contractor, the owner and company. In response, property owners and construction companies, manufacturing facilities, energy exploration sites, infrastructure locations have attempted to limit and/or control access to and/or monitor construction sites, commercial properties, manufacturing facilities, the US infrastructures, and energy sector sites or hire off-duty law enforcement as security. Limiting and/or controlling access is, however, difficult and, in early stages of construction (not just talking about construction, we are talking about all the other above mentioned entities and applications as well), nearly impossible. Property owners of all types have also used monitoring systems to deter vandalism and theft. These attempts have also been in vain. For example, such monitoring systems typically emit an audible alarm upon sensing a particular event, such as motion, and, especially in remote areas, are seldom heard.

At some sites, these entry/exit points are being monitored by security companies that staff these locations with retirees living and operating out of their own recreational vehicles posted at each entry/exit point designated by the customer for 24 hours a day/7 days a week. Their primary responsibility is to log the time and date of a vehicle's license plate, possibly a person's identification and report any suspicious activity.

Due to the fact the job requires a worker to work 24 hours a day/7 days a week makes it difficult for a security company to keep up the staffing due to the limited number of workers available and licensed to do the job.

These types of security and control system are flawed. Human error plays a significant role in the accuracy of the information being collected and how the entry/exit point is maintained and enforced. The lack of attention to detail due to fatigue, favors for frequent visitors, potential theft, and personal injury incidents are some examples. The question on whether the security guard's testimony and recollection of events standup in a court case should the need arise is another not to mention the safety of workers placed in a position of having to defend themselves should the need arise out on location. The current system have a vast potential for corruption as a result of the security personnel becoming weary and frustrated on the job due to boredom and the amount time they put in versus the money they make for guarding an access point.

The current systems mentioned are intended more for deterring vandalism and theft rather than actually acquiring visual incriminating evidence to catch for the purpose of reprimanding an employee or providing reliable evidence to law enforcement for the purpose of prosecuting a crime and catching the perpetrators.

A need exists for a portable, unmanned, entry & access control system capable of logging and/or allowing or denying the access and egress of vehicular and pedestrian traffic to a site, wherein the system includes monitoring and/or recording to provide security redundancy and security that is verifiable.

The present embodiments meet these needs.

BRIEF DESCRIPTION OF THE DRAWINGS

The detailed description will be better understood in conjunction with the accompanying drawings as follows:

FIG. 1 depicts the security and control system according to one or more embodiments.

FIGS. 2A-2C depict a diagram of equipment usable with the system according to one or more embodiments.

Figure 2A:
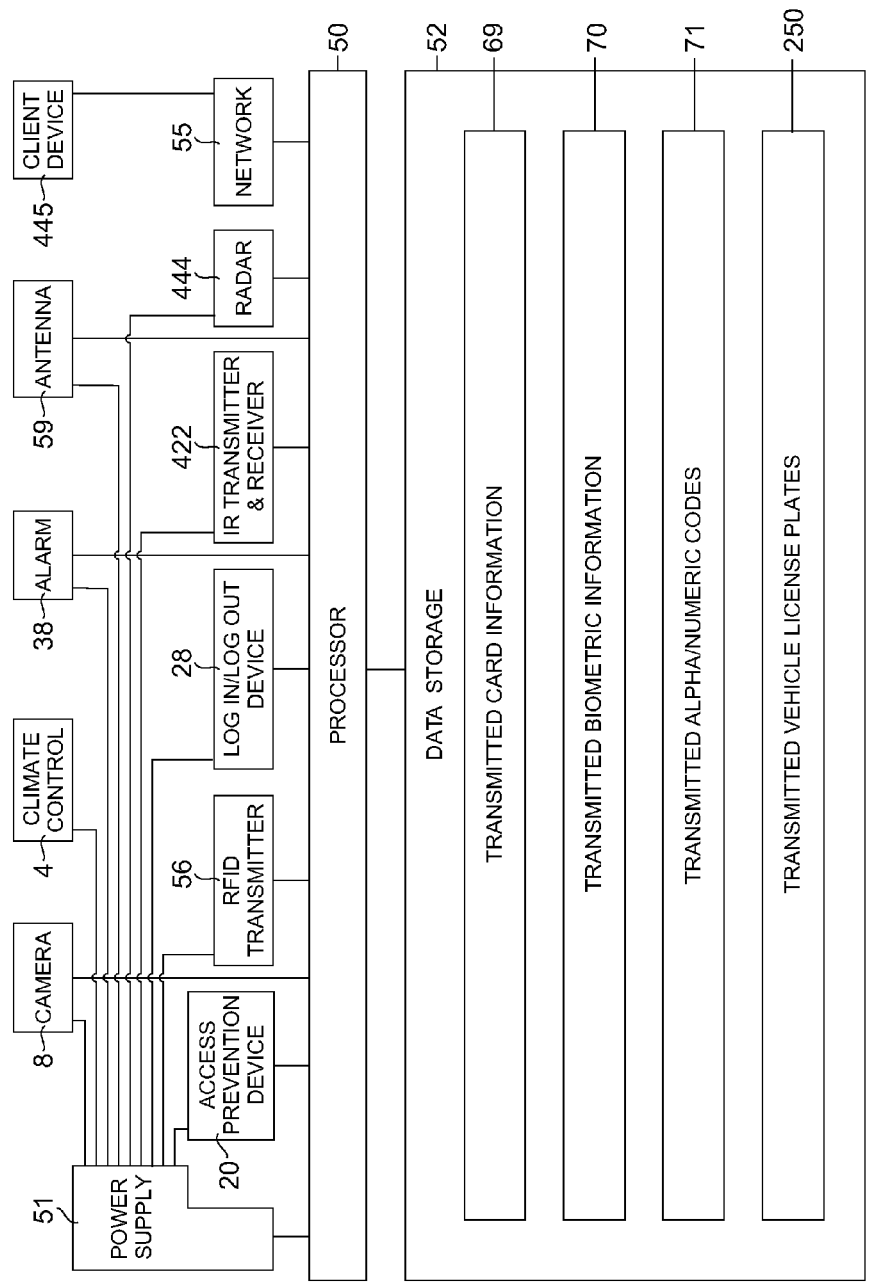

The present embodiments are detailed below with reference to the listed Figures.

DETAILED DESCRIPTION OF THE EMBODIMENTS

Before explaining the present system in detail, it is to be understood that the system is not limited to the particular embodiments and that it can be practiced or carried out in various ways.

The embodiments relate to a self-contained portable unit with integral access control and tracking system providing a portable, unmanned, entry and access control systems capable of logging tagged assets while simultaneously allowing or denying access to a perimeter area and egress from a perimeter area of vehicular, human and animal traffic.

The system monitors and/or records radio frequency identification "RFID" tagged assets stops non-RFID tagged assets from entering a site unless a login/logout device is used with libraries of login information.

The system can generate on-site audible and visual alarms and generate reports on assets movement and non-asset non-tagged animal, human and vehicle movement.

The system can communicate with a network for remote monitoring of the unmanned sites, with an executive dashboard created by a processor of the system from client devices of customers connected to a network.

The embodied systems herein are secure, redundant, and verifiable.

The systems are computer-enabled, direct, networked or both and provide an array of various types of monitoring on and/or in a self-contained housing.

Examples of monitoring can include cameras and radar detection; monitoring means are discussed in more detailed herein.

The self-contained housing can be a skid mounted, trailer mounted, or vehicle mounted, with a housing capable of being easily located on-site quickly and then removed and relocated at another site with ease. The housing can include its own secure fencing or can be used in conjunction with the enclosed fencing already located at the site. In embodiments, the systems can be mounted to a pole or a fixed structure inside the secured fenced area.

The embodiments provide security and/or access and control radar detection and tracking monitoring systems that are highly secure, access-controllable, flexible, and hierarchical. The security and/or access and control monitoring systems are comprised of a computer-enabled and direct or network linked apparatus, such as wireless, satellite or the like, software, and methods. The security and/or access and control monitoring systems provide for the use of interactive environments, like the internet, to enable rapid access, monitoring and control by the user.

In addition, the embodied systems allow for the initiation of appropriate responsive actions by users to address incidents captured and controlled by the embodied access control monitoring and security systems. For example, the systems visually capture license plates of vehicle entering and exiting, utilizing license plate recognition software (analytics) and hardware. Occupants of vehicles and its contents and/or walking traffic can be recognized and noted utilizing facial recognition software and hardware. Entering and exiting of the site of property, possessions, equipment, employees, visitors, and the like can be catalogued over the course of a day, weeks, months or years using time and date stamping video recordings and still pictures acquired day or night, regardless of weather conditions. The collected data can be archived to the computer-enabled data storage system. The data can be accessible locally or remotely by the user who can then acquire and save the data to their own computer-enabled system.

The embodied systems can also incorporate metal detectors and imaging capability, such as millimeter wave advanced imaging technology (AIT), to safely screen individuals for metallic and nonmetallic threats, such as weapons, explosives, and the like, which can be concealed under clothing without physical contact. The embodied monitoring systems can be used as anti-terrorism systems.

The system has redundancy capability built-in to prevent loss of control functionality and data in the event of component or system failure. In embodiments, the systems can be equipped with a battery, battery back-up, solar power, generator power, electrical service offsite, and combinations thereof. The systems can have offsite electronic data storage, such as cloud storage or the like, lightning arrestors, surge protection and automated restart in the event the system loses power. Since the systems are portable, the embodiments can include low jack technology or the like in case the unit is stolen. The systems can include electronic notification to the third parties, such as law enforcement, should the unit be tampered with in any way other than its normal use.

The embodied on-site portable monitoring and security systems include or utilize television/video camera systems, still camera systems, computers or data processors, radar, AIT, and any communications equipment, hardwired or wireless. The systems are designed to control the access and egress of a person, vehicle, or object through a door, gate, entrance or exit, such as through an AIT and/or tracking by radar the movement of those mentioned.

The embodied systems detect, signal, record and/or transmit a signal of an authorized and/or unauthorized entry or attempted entry of a person or object into or on to property monitored by system. The embodied systems detect, signal, record and/or transmit a signal an authorized and/or unauthorized egress or attempted egress of a person or object from a property monitored by system. The embodied systems detect, signal, record and/or transmit a signal of an emergency on property monitored by system. The embodied systems record, transmit, or archive data, such as visual images, radar tracking, and the like, and identifying information of individuals, objects, or property monitored by system. The embodied system can scan the area and record in its memory a photo of the area; when the system scans the area again and notices any change in the area, the embodied system can send an alarm and/or a notification.

The embodied systems are portable and are easily moved to a location on the site to be secured. Monitoring devices, security devices, access/egress systems, and other accessories can be installed on-site, typically onto the housing itself. The embodied systems can be quickly and easily set up and deployed by personnel having only limited knowledge of how to operate the system. In essence, personnel such as a construction crew can simply transport and set up portable security system as discussed above, without a need for complex and time-consuming system configuration. Power and security systems can be directly linked on-site or, alternatively, the system can include its own power systems and wireless communication systems.

In embodiments, the systems can be used for outdoor use. In many cases, the portable security system can be exposed to the elements and other harsh environments. As such, the embodied systems, especially the housing and entry/exit systems, can withstand the extremes of inclement weather, including low and high temperatures, high winds, lightning, precipitation, dust, sand, and sudden enhanced non-thermal radio emissions from the high solar corona immediately following a solar flare.

Once installed, the system can then begin a predetermined security and monitoring system configuration (i.e., a computer program and associated input and output devices). The embodied systems can be pre-configured and/or re-configured either locally or from a remote site. Remote configuration allows for embodied system's access control monitoring and security protocols to be changed as the needs for the site change or as the characteristics of the site become better known.

Other examples of uses for the embodied systems can include law enforcement for pedestrian and vehicular security and access control for special events, such as concerts, carnivals, and rodeos; special applications; road and bridge projects for securing equipment, employee access, and the like; and border protection in utilizing radar tracking and license plate recognition.

In embodiments, the physical structure can allow vehicular and pedestrian traffic to enter and exit a property or location monitored by the system utilizing a keypad, card swipe, and any known access control technology means, such as proximity cards, fingerprint readers, iris recognition scans, hand geometry scanners, and the like, can be used to gain access or egress the location.

In embodiments, the security and control system can be portable.

The system itself can be self-contained and transportable to the site as needed. The system can be skid mounted using a skid undercarriage or trailer mounted.

In embodiments, the security and control system can be located at an opening to a perimeter area, which can be surrounded by a fence.

In embodiments, since, in many cases the portable security system will be exposed to the elements, the housing can be a weather resistant housing and/or vandal resistant.

In embodiments, the housing can be composed of reinforced steel. Lighter, less rigid materials, such aluminum and wood can be used in other embodiments.

One purpose of the housing is to enclose the security communication system, which is comprised of the control, communications, data input, data transfer, data storage and output subsystems, such as DVRs, video recorder, power sources, and the like, of the security and control system. To assist this purpose, the housing can include an environmental control unit to maintain the interior of the housing at a temperature suitable for the electronics or any other items kept inside the housing. A supplemental heating device, controlled by environmental control unit can be optionally be added.

Various conventional devices can be employed to maintain the operating temperature of components of the system within a desired range, such as thermostatically-controlled heaters and fans. The heaters and fans can also be controlled locally by the security system in cooperation with temperature sensors located in the housing or remotely using wireless communication means. The housing can further include one or more interior condition sensors, such as a motion sensor, a smoke sensor, a humidity sensor, a heater flameout sensor, a temperature sensor or combinations thereof.

The housing can also provide the appearance of the embodied system being manned in order to provide another level for the security for the site where the security and control system is located. The housing can include real windows or simulated windows to add to the appearance as if someone was inside the housing.

A door or similar type of opening can be used to access to the interior of the housing. The access itself can or cannot be restricted based upon the use and/or application of the embodied system. In embodiments, access to the interior of the housing can be restricted by its own restricted access security, such as a security keypad, keyless entry or by any other means known to the access control industry, such as biometric security means. Alternatively, the housing can be secured by simple locking means. Regardless, any type of locking system, access security or combination thereof comparable to the security or locking means can be used.

Once on-site, the security and control system can be leveled, anchored to the ground, powered up, and/or adjusted, as need be. Once set, any accessories, on-site alarms, monitoring devices, access/egress systems, and security means can be attached to the housing or skid undercarriage.

With regard to the on-site alarms, the on-site alarms can be triggered based on signals received from the access control and security system. Examples of on-site alarms can include, but are not limited to, a siren, a floodlight, an indicator light, an electrically actuated device, an annunciator, a strobe light, or combinations thereof. An alarm can be used that is visual, such as a beacon or audible.

With regard to monitoring devices, the security and control system can include monitoring devices mounted to, mounted in, mounted on, mounted around, mounted on top of, and mounted underneath the housing. Examples of monitoring devices can include cameras, facial recognition means, motion sensors, heat sensing means, heat sensors, any type or method of known imaging capturing devices, biometric devices, card readers, radio frequency devices, vibration/shock sensors, light detectors, infrared transmitter/receivers, license plate recognition analytical software and hardware and the like. Other types of sensing devices can include radar (detection of moving and stationary targets, as well as, tracking any moving objects), facial recognition sensors, and scanners (such as to read license plates or VN numbers). Regardless, any known type of monitoring devices and sensing devices or combination thereof comparable to the monitoring devices and sensing devices can be used.

The system can include one or more cameras that can be a still or rotating, video, or thermal camera or electromagnetic radiation of any wavelength, whether visible or not, and can provide monochromatic or color images. Any conventional data format can be utilized, including, but not limited to, national television system committee (NTSC) and phase altering line (PAL) formats. Alternatively, the cameras can be part of a night vision imaging system (NVIS) that captures visual data under low-light conditions or electromagnetic radiation of any wavelength, whether visible or not. In addition, the cameras can include multiple one- or two-axis servo mounted cameras to provide the user with remote control over the camera's field of view. Common controls for the cameras, such as pan, tilt, zooming and focus, can be remotely accessed and adjusted by means of the security system discussed herein.

In embodiments, the processor can receive signals from each monitoring device and receive signals from a remote user or a remote system. The security communication system can also send signals to an external system, an external user, on-site alarms, accessories, such as lighting, and entry/exit systems based on the received signals. The transmissions can occur through wired, wireless, or satellite communication connections or any other means of generating a radio frequency signal or combinations thereof. A satellite dish can connect to the housing for wireless transmissions to the network, such as internet, for example. The transmissions between the monitoring devices, the security system, and the external system or external user can be continuous, periodic, or only when a sensed stimulus exceeds a predetermined threshold, depending on the monitoring level desired at the site. The data transmitting also allows the system to send updates and/or real time notifications on entry and exits as well as updates and/or real time notifications on security status to remote systems.

The embodiments can include access/egress systems or entry/exit systems in order to control the access and egress of a person, livestock, other animals, vehicle, or object to the site. Examples of entry/exit systems can include any type of drop arm gate, gate, fence, turnstiles, or the like. The embodied system can incorporate a mantrap, which is a system comprising a small space with two sets of interlocking doors, gates, or the like that locks and unlocks each door in sequence. An intercom or other communication methods and/or video camera can be used to allow the user to control the mantrap from a remote location. In embodiments, the mantrap can include an air lock, or access control vestibule.

As an example, an entry gate arm and an exit gate arm can be affixed to the housing.

Each gate can have a login/logout device, such as a card reader and hose switch. Speed bumps can be usable herein. Other types of monitoring devices can be integrated with the entry/exit systems, which can include proximity cards, RDIF transponders, a bar code reader, license plate recognition software, driver license readers, auto expiring access codes, a keypad, print recognition software, facial recognition software, iris recognition software, hand geometry scanners and/or RF transmitters.

In use, the automated system can use one or more cameras to record a person, vehicle, or object entering or exiting the site at, around or near the gate arm and records the subsequent actions, such as, entry, exit, a gate strike, damage to the gate, and the like, as well as capturing video of any attempt to bypass the system and sneak onto or exit from the guarded site. The cameras can also assist in license plate recognition or facial recognition. Based on input from the login/log out device, the cameras and any other monitoring devices, the persons, vehicles, or objects are either allowed to enter or exit or not.

If the persons, vehicles, or objects are authorized, the security system sends a signal to the gate arm or other access control device to open in order allow entry or exit of the persons, vehicles, or objects. The video of the movement can be recorded and saved to the data storage and/or transmitted to an external system and/or user; in addition, the entry or exit itself is date and time stamped, recorded and saved to the data storage and/or transmitted to an external system and/or user. All data, including the person's, vehicle's, or object's photograph, recorded name, license plate, and other collected data can be stored together as a single event.

If the persons, vehicles, or objects are not authorized, the gate arm is not raised. Rather, based upon programmed specifications, the security system sends a signal to the initiate local alarms, contact the external system or external user, which can include law enforcement. Like the authorized entry, the unauthorized attempted entry or exit itself is date and time stamped, recorded and saved to the data storage and/or transmitted to an external system and/or user. All data, including the person's, vehicle's, or object's photograph, recorded name, license plate, and other collected data can be stored together as a single event.

In embodiments, the power supply can include a DC and/or AC power source, AC/DC converters, DC/AC inverters, AC mains and solar panels. An external generator can optionally be coupled to the power supply to supply power to the portable security system and/or charge batteries. If batteries are used, they can be housed in a battery box to prevent tampering by unauthorized personnel. In embodiments, the battery box can be enclosed and can contain one or more compartments to contain at least one conventional battery. Solar arrays, solar panels and solar power electricity can be used to augment power supply and/or charge batteries in the power supply. In addition, the security system can operate in accordance with a predetermined set of instructions, such as a computer program, to turn off various components of security and control system when they are not needed.

Login/Logout devices usable for access to the site, but, as discussed throughout, any known access control technology for opening doors, gates, and the like can be used, such as proximity cards or biometric devices, such as fingerprint readers or iris recognition scans and/or a hand geometry scanner.

Infrared (IR) detector systems can be used with the system.

In embodiments, multiple beams can be delivered between a multiple infrared beam transmitter and a multiple infrared beam reflector can be generated. When a human or vehicle passes through, the beams signals can be sent to the processor of the system triggering alarms. Based on its programming parameter, the security communication system can trigger alarms, alert third parties, such as law enforcement, remotely, and/or time stamp and save the incursion for future review.

In embodiments, the multiple infrared beam transmitter can be affixed to the housing and the infrared beam reflector can be installed at any distance away from the beam transmitter typically covering the opening to site.

The infrared beam reflector, however, can be extended out to long distances and not just covering the opening to site. The infrared (IR) detector system can be established on both the entry side and the exit side of the security and control system.

The infrared beam reflector can be positioned away from a wall of a housing on the exit side with the infrared beam transmitter (hidden) located on the housing. The infrared (IR) detector system can be configured so that if an animal, such as a dog, a cat, a bird, or the like, crosses the beams and as such, only one or two beams are interrupted, then the alarm will not be set off.

Solar panels, a radar detection and tracking system and a wireless antenna can be used with the system.

Windows can be located on the housing. As previously discussed, the windows, can be either real or simulated, to add to the appearance as if someone was inside the housing.

It should be noted that the cameras can be mounted in or on the bollards. As previously discussed, the cameras can be cameras or any method of known imaging capturing, facial recognition means, motion sensors, heat sensing means, heat sensors, or the like.

The system can transmit signals to an external system or network. Using the network an external user can monitor the housing and base, and monitor on-site alarms or accessories, such as lighting, and entry/exit systems based on the received signals. The transmissions can occur through wired, wireless, satellite communication connections or any other means of generating a radio frequency signal or combinations thereof.

In embodiments, the cameras can be located atop a pole. The pole can be a fixed height pole or an extended pole. The height of the pole is nonrestrictive. The pole can protected from unauthorized persons by fencing. The fencing can be chain linked, wooden, or made from other material common to fences. Security means, such as a locked access door or barbed wire, can be included for more security from unauthorized persons.

Though the system depicts only a camera as the monitoring means, any known type of monitoring devices and sensing devices or combination thereof comparable to the monitoring devices and sensing devices can be used. Examples of such monitoring devices include cameras, facial recognition means, motion sensors, heat sensing means, heat sensors, any type or method of known imaging capturing imagers, light detectors, infrared transmitter/receivers, license plate recognition analytical software and hardware and the like. Other types of monitoring devices can include radar detection of moving and stationary targets, as well as, tracking any moving objects, facial recognition sensors, and scanners, such as to read license plates or VN numbers.

The following is an example of a method of use for an embodiment of the security and access entry control system. The client orders security and/or entry control services and specifies system requirements (Step 100). The system is configured according to the client's specifications (Step 102). The unit is loaded on a trailer and delivered to the site specified by client (Step 104). The unit is offloaded on to the temporary site specified by the client to be installed (Step 106). The unit is leveled, anchored to the ground, powered up, and adjusted, as need be (Step 108). When the client is finished utilizing the unit's service at that site (Step 110), the unit can be powered down and unanchored (Step 112), then can be either moved to the next location (Step 114) or returned to the service provider (Step 116).

Turning now to the Figures, FIG. 1 shows a self-contained portable unit with integral automated unmanned computer operated asset control system and integral access/egress system 1.

The self-contained portable unit with integral automated unmanned computer operated asset control system and integral access/egress system is used to form a tracking report of radio frequency identification (RFID) tagged assets and to control entry and exit from a perimeter area, which can be fenced.

The self-contained portable unit with integral automated unmanned computer operated asset control system and integral access/egress system 1 can have a housing 2 integral with a base 3.

At least one access prevention device 20a and 20b can be physically mounted to the housing 2, the base 3, or both.

The access prevention devices can be electrically connected to the power supply 51.

The access prevention devices can be used for automatedly opening and closing to allow or prevent ingress or egress past the housing by: (i) an RFID tagged asset 21a with an RFID tag 23a, shown as a bull with an ear RFID tag; (ii) a moveable element 25 without an RFID tag, shown as the truck with no RFID tag; or (iii) a moveable element 25 containing a pipe 21b that is an RFID tagged asset with an RFID tag 23b.

An RFID transmitter/receiver 56 can be mounted in the housing or mounted to the housing as shown.

The RFID transmitter/receiver 56 can be configured to identify RFID identifier 19 on RFID tag 23 and then transmit the RFID identifier 19 from RFID tags 23a and 23b to the processor, shown in later Figures, when the RFID tagged asset moves past or is within the zone of the RFID transmitter/receiver 56.

In embodiments, the RFID tagged asset or moveable element can be equipment, an animal, a vehicle, or any asset to be secured and/or monitored.

In embodiments, an environmental control unit 4, which can be a climate control unit for climate control within the housing can be used.

In embodiments, the environmental control unit 4 can be used for climate control, such as a heater, an air conditioner, a dehumidifier or a similar device.

A steel bumper 34 and bollards 16 and 18 can be used within the system. The bollards can be either fixed or breakaway devices connected to the base 3 to protect the housing 2 from being struck by a vehicle or object. The steel bumper 34 and bollards 16 and 18 also enlarge the unit's profile.

A communication dish 6 is shown attached to the housing 2.

In embodiments, the system can use at least one camera. A camera 8a can be mounted to a pole attached to the base 3 and cameras 8e can be mounted on the housing.

In this Figure, it can be seen that the cameras can be positioned to target at least one of: an entry area 130 to record at least one of: movement of any RFID tagged asset when the RFID transmitter/receiver identifies an RFID tagged asset; and a vehicle image lacking an RFID tag capturing a vehicle license plate.

In this Figure, it can be seen that that cameras can be positioned to target at least one of: an exit area 131 to record at least one of: movement of any RFID tagged asset when the RFID transmitter/receiver identifies an RFID tagged asset; and a vehicle image lacking an RFID tag capturing a vehicle license plate.

Still another area that the camera can target can be a perimeter area 132 to record at least one of: movement of any RFID tagged asset when the RFID transmitter/receiver identifies an RFID tagged asset; and a vehicle image lacking an RFID tag capturing a vehicle license plate.

In embodiments, a fence 40 can surround the perimeter area 132.

The automated unmanned computer operated access/egress system is connected to the power supply; in communication with the processor and in communication with and operating simultaneously with, the automated unmanned computer operated asset control system.

The self-contained portable unit with integral automated unmanned computer operated asset control system and integral access/egress system can include components, such as one or more lights 12a and 12b and one or more log in/log out devices 28a and 28b.

The log in/log out devices 28a and 28b are shown mounted on the housing or to the base.

In embodiments, speed bumps 30a and 30b can be used to control movement past the housing. The speed bumps can be moveable and portable, such as made from recycled plastic.

At least one hose switch 32 can be used within the system. Hose switches can be driven over by a car, but might be missed by a person or livestock walking and can connect to the processor and act as an alarm or counter.

The self-contained portable unit with integral automated unmanned computer operated asset control system and integral access/egress system can have alarms 38a and 38b. The alarms 38a and 38b can be connected to the processor and the power supply for providing a visual or audible alarm when one of the vehicle license plate images, the transmitted card information, the transmitted biometric information, and transmitted alpha/numeric code does not match or when at least one camera records unauthorized movement from the perimeter area or into the perimeter area with an RFID tagged asset or with a moveable element 25 without an RFID tag.

Simulated or real windows 54a and 54b are shown on or in the housing.

The self-contained portable unit with integral automated unmanned computer operated asset control system and integral access/egress system can have an antenna 59 affixed to the housing and in communication with the RFID transmitter/receiver 56.

A bollard is shown with a hidden camera or sensor 100.

A motion sensor antitheft device 170 is depicted mounted to the housing or base.

Also shown are a battery 176, a wind turbine 171, a generator 14, and a solar panel 172 mounted to the housing 2. The battery, wind turbine, generator and solar panel can substitute for the power supply 51 or be in addition to the power supply 51.

In embodiments, an infrared transmitter/receiver 422 can be mounted to the housing 2.

The infrared transmitter/receiver can be configured to provide a plurality of infrared beams contacting an infrared reflector. Infrared reflectors 424a and 424b are shown, forming an infrared fence. The infrared transmitter/receiver 422 can also transmit an alarm to the processor when at least one of the infrared beams of the infrared fence is broken for inclusion into the tracking report.

In embodiments, a radar transmitter/receiver 444 can be mounted to the housing.

The radar transmitter/receiver 444 can be configured to provide pings towards the ground for detecting and tracking any object in the vicinity of the housing and base, and transmit an alarm to the processor if any object enters all or a portion of the perimeter area.

FIGS. 2A-2C depict a diagram of equipment usable with the system according to one or more embodiments.

The self-contained portable unit with integral automated unmanned computer operated asset control system and integral access/egress system can have a processor 50 with data storage 52.

The term "data storage" refers to a non-transitory computer readable medium, such as a hard disk drive, solid state drive, flash drive, tape drive, and the like. The term "non-transitory computer readable medium" excludes any transitory signals but includes any non-transitory data storage circuitry, e.g., buffers, cache, and queues, within transceivers of transitory signals.

The processor 50 and data storage 52 can be contained inside the housing and connected to the power supply 51.

In embodiments, at least one access prevention device 20, at least one camera 8, at least one RFID transmitter/receiver 56, at least one climate control unit 4, at least one log in/log out device 28, at least one alarm 38, at least one infrared transmitter/receiver 422, at least one antenna 59, and at least one radar transmitter/receiver 444 can be connector to the processor 50 and the power supply 51. The processor 50 can connect to or be in communication with a network 55, which can additionally connect to or be in communication with at least one client device 445, such as a laptop computer.

In embodiments, the at least one camera 8 can be electrically connected to the power supply and in communication with the processor 50.

The data storage 52 can receive transmitted card information 69, transmitted biometric information 70, transmitted alpha numeric codes 71, and transmitted vehicle license plate images 250.

In embodiments, the at least one log in/log out device 28 can be in electrical connection to the power supply and in communication with the processor.

The at least one log in/log out device can be configured to receive and form transmitted card information 69 from a user seeking access to or exit from a perimeter area controlled by the self-contained portable unit; receive and form transmitted biometric information 70 from a user seeking access to or exit from a perimeter area controlled by the self-contained portable unit; and/or receive and form transmitted alpha/numeric codes 71 for a user seeking access to or exit from a perimeter area controlled by the self-contained portable unit.

In embodiments, the data storage 52 can have a library of RFID tags 49.

The library of RFID tags 49 can have a plurality of RFID tags 23, wherein each of the RFID tags can have an RFID identifier 19 and tagged asset specifications 29.

The data storage can have a plurality of computer instructions stored therein, to instruct the processor to do various tasks.

The data storage 52 can contain computer instructions 159 to compare transmitted RFID identifiers to the library of RFID tags.

The data storage 52 can contain computer instructions 60 to generate a tracking report.

The tracking report 400 can include a date 402 and RFID identifiers 19 for RFID tagged assets.

The automated unmanned computer operated asset control system formed using the housing with base, processor and access prevention device simultaneously: controls movement of RFID tagged assets from a perimeter area; verifies location of RFID tagged assets in a perimeter area; and generates a tracking report on the movement and location of RFID tagged assets into or from a perimeter area.

The data storage 52 can have a library of license plates 63, which can include license plate images 64.

The data storage 52 can contain computer instructions 61 for license plate recognition.

Computer instructions 61 can provide instructions to the processor to match the transmitted vehicle license plate image from at least one camera to license plate images 64 in the library of license plates 63.

Computer instructions 61 can provide instructions to the processor to provide a command to the access prevention device to automatically prevent entry to the perimeter area if the transmitted vehicle license plate image does not match a license plate image 64 in the library of license plates 63.

Computer instructions 61 can also provide instructions to the processor to provide a command to the at least one access prevention device to automatically provide entry if the transmitted vehicle license plate image does match a license plate image 64 in the library of license plates 63.

The data storage 52 can contain computer instructions 202 for card information matching.

Computer instructions 202 can instruct the processor to match transmitted card information from the at least one log in/log out device to card information 205 in a library of card information 204, which can also be located in the data storage.

Additionally, computer instructions 202 can instruct the processor to provide a command to the access prevention device to automatically prevent entry if the transmitted card information does not match and provide a command to the access prevention device to automatically provide entry if the transmitted card information does match.

The data storage 52 can contain computer instructions for biometric information matching 206.

Computer instructions 206 can instruct the processor to match transmitted biometric information from the at least one log in/log out device to biometric information 207 in a library of biometric information 208, which can also be located in the data storage.

Computer instructions 206 can additionally instruct the processor to provide a command to the at least one access prevention device to automatically prevent entry if the transmitted biometric information does not match and provide a command to the at least one access prevention device to automatically provide entry if the transmitted biometric information does match.

In embodiments, the biometric information 207 can include stored biometric files, such as retinal images, fingerprint images, hand scans, and voiceprints.

The data storage 52 can contain computer instructions 210 for alpha/numeric code matching.

The computer instructions 210 can instruct the processor to match a transmitted alpha/numeric code from the at least one log in/log out devices to alpha numeric codes 211 in a library of alpha/numeric codes 212, which can also be located in the data storage.

Computer instructions 210 can additionally instruct the processor to provide a command to the at least one access prevention device to automatically prevent entry if the transmitted alpha/numeric code does not match and provide a command to the at least one access prevention device to automatically provide entry if the transmitted alpha/numeric code does match.

The data storage can also contain entry area recording 133, exit area recording 135 and perimeter area recording 137. In embodiments, the entry area, recording, the exit area recording and the perimeter area recording can be transmitted from the at least one camera on the housing or adjacent the housing and stored in the data storage.

The data storage 52 can contain computer instructions 260 for providing a visual or audible alarm when one of the transmitted vehicle license plate images 250, transmitted card information 69, transmitted biometric information 70 and transmitted alpha/numeric code 71 do not match or when at least one camera records unauthorized movement from the perimeter area or into the perimeter area with a RFID tagged asset or a moveable element 25 without an RFID tag.

The data storage 52 can contain computer instructions 262 for transmitting the tracking report from the processor to the network and at least one client device connected to the network for remote monitoring.

The self-contained portable unit with integral automated unmanned computer operated asset control system and integral access/egress system can automatically supplement the formed tracking report 400 with information on the matching of any of the vehicle license plate images, the transmitted card information, the transmitted biometric information, the transmitted alpha/numeric code and the RFID tagged assets.

It should be noted that in embodiments, the camera provides at least one of: video images, infrared images, still images, and combinations thereof.

In other embodiments, it should be noted that the at least one log in/log out device can be a card reader, a biometric information reader, such as a finger print reader, or a voice print reader, or an alpha/numeric keypad.

In embodiments, the processor can be a plurality of processors.

In embodiments, an access prevention device can be at least one of a closable/openable sliding gate, a rolling fence, a sliding wall, at least one folding bollard, a popup bollard, a drop arm gate, or combinations thereof.

The network can be a cellular network, a satellite network, a global communication network, a fiber optic network, a wide area network, a local area network or combinations thereof.

The processor can be a computer, a laptop, a tablet computer, or a plurality of computers connected together.

The log in/log out device can be configured for receiving input from at least one of: a chip card, a proximity card, a magnetic card, and a biometric source including retinal images, fingerprint images, voice prints, and hand geometry scans.

The power supply can be on-board the base or in the housing.

The term "tagged asset specifications" can include age, manufacturer name, owner name, date of last repair, cost to procure, and materials of manufacture for inclusion in the tracking report.

For livestock, the tagged asset specifications can include lineage information and breeding status. For vehicles, the tagged asset specifications can include information on tires and crashes. For equipment, the tagged asset specifications can include next inspection dates and similar information.

In embodiments, the tracking report 400 can be transmitted from the processor 50 to the network 55 and to client devices 445 connected to the network for remote monitoring of the self-contained portable unit with integral automated unmanned computer operated asset control system and integral access/egress system.

Figure 3:
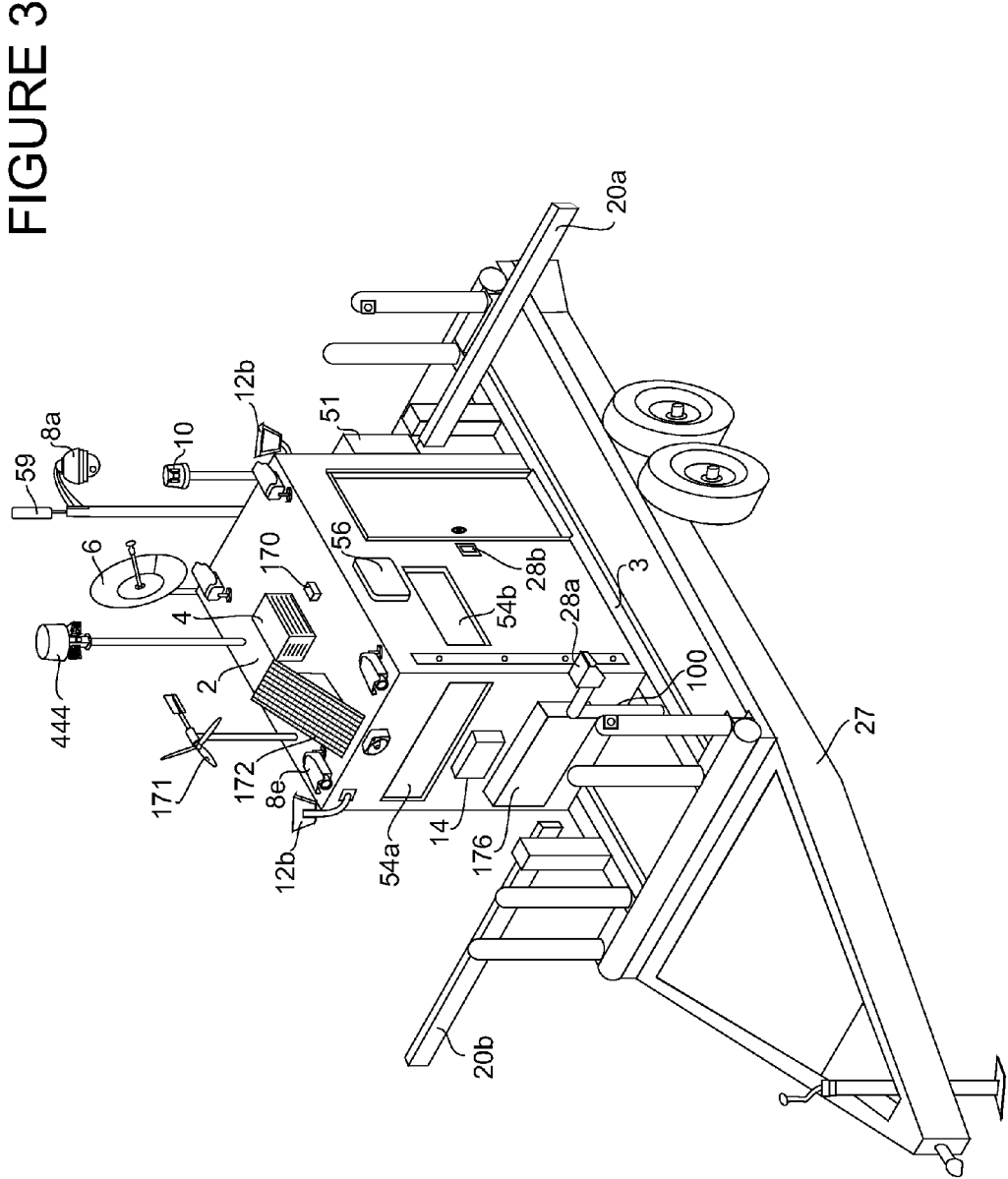
FIG. 3 depicts a trailer mounted version of the security and control system according to one or more embodiments.

FIG. 3 depicts a trailer mounted version of the security and control system according to one or more embodiments.

The trailer mounted version of the self-contained portable unit with integral automated unmanned computer operated asset control system and integral access/egress system is shown with a wheeled frame 27 with the housing 2 on the base 3.

The environmental control unit 4 can connect to the power supply 51 for climate control within the housing.

The communication dish 6 is shown attached to the housing to communicate with the processor, which can be located within the housing 2.

In embodiments, the communication dish 6 can provide bidirectional communication with the internet or another network 55.

Camera 8a is shown mounted to a pole rising from the wheeled frame. Camera 8a can communicate with the processor and with the power supply 51.

Cameras are shown mounted to the top of the housing 3 and can communicate with the processor and the power supply. Only one camera 8e is labeled.

A beacon 10, which is a form of alarm, is shown mounted to the housing and can communicate with the processor and with the power supply 51.

Two lights 12a and 12b are shown mounted to the housing 2. The lights can also connect to the power supply 51, which can be a battery pack.

Two access prevention devices 20a and 20b are depicted as gates. In embodiments, the access prevention devices can be communication with the processor and the power supply.

Two log in/log out devices 28a and 28b are shown. Log in/log out device 28a is shown as a card reader and log in/log out device 28b is shown as a keypad. Both log in/log out devices can be in communication with the processor and the power supply.

Simulated or real windows 54a and 54b are shown formed in the housing 2.

The RFID transmitter/receiver 56 is shown mounted to the housing 2 and can communicate with the processor and the network and can be connected to the power supply.

The antenna 59 is shown on a pole secured to the wheeled frame 27 and the antenna can communicate with the processor.

The motion sensor antitheft device 170 is depicted mounted to the housing for automatically providing a signal or message using the network when the housing with base is moved. The motion sensor antitheft device can communicate with the processor.

Also shown are a battery 176, which can be external batteries, a generator 14, a wind turbine 171 and a solar panel 172 mounted to the housing and can be in electrical connection where signals communicate with the processor.

The hidden camera or sensor 100 can be located in a bollard, which can be a heat sensor, a motion sensor, an audible sensor or similar device. The hidden camera or sensor 100 can be connected to the processor.

In embodiments, the cameras and/or the hidden camera or sensor can be in wired or wireless communication with the processor and or network.

The radar transmitter/receiver 444 is shown mounted to the housing and in communication with the processor and the power supply.

Figure 4:
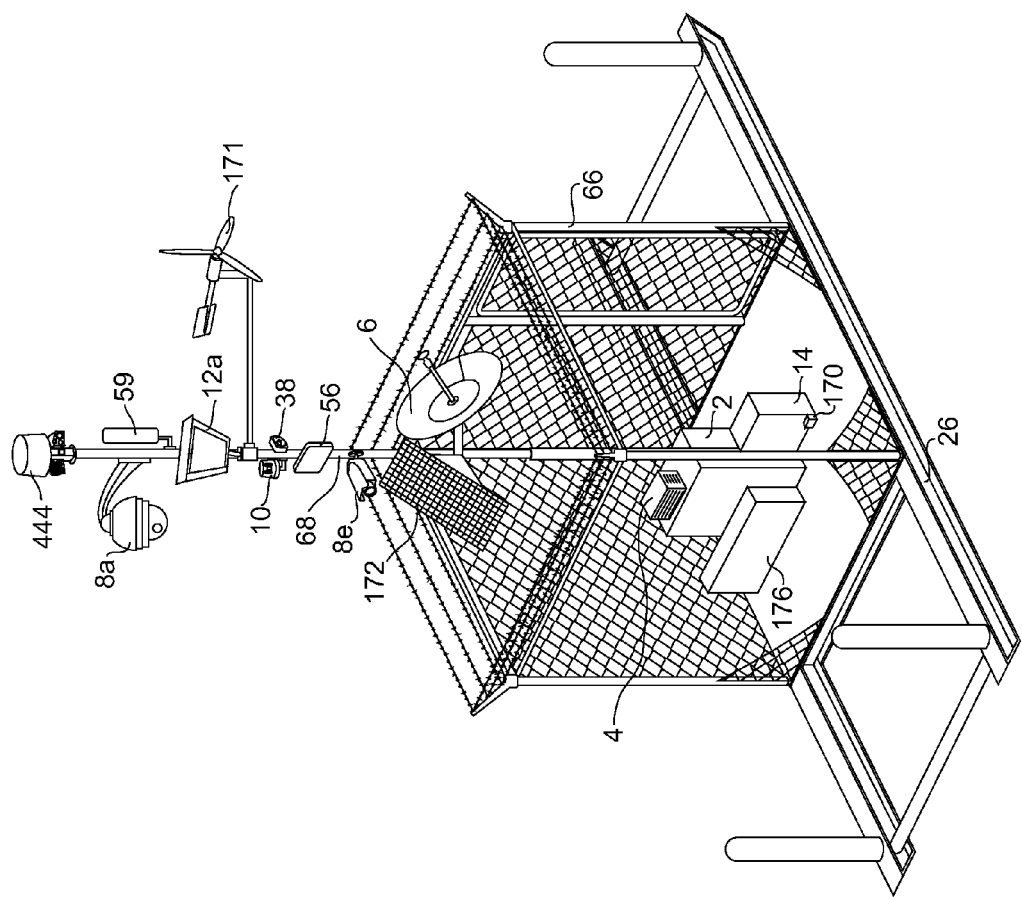
FIG. 4 depicts a skid mounted version of the security and control system according to one or more embodiments.

FIG. 4 depicts a skid mounted version of the security and control system according to one or more embodiments.

The skid mounted version of the self-contained portable unit with integral automated unmanned computer operated asset control system and integral access/egress system is shown with a skid 26 supporting an open enclosure 66 which can contain the housing 2.

Even though the open enclosure 66 has no solid walls, it can contain environmental control unit 4, the generator 14, which can be external, the motion sensor antitheft device 170 and the battery 176. The battery can power the processor, which can be located inside the housing 2.

In embodiments, the open enclosure 66 can be formed with fencing material.

The skid mounted version can include the communication dish 6, which can be a satellite dish, to connect to the housing for wireless transmissions to the internet, for example. The communication dish can connect to the processor.

In embodiments, the solar panel 172, cameras 8*a* and 8*e*, and the RFID transmitter/receiver 56 can also connect to the processor and the power supply.

In embodiments, the skid 26 can have a pole 68. The beacon 10, which can act as the alarm when commands are received from the processor is shown attached to the pole 68. A light 12*a* can also be mounted to the pole 68. The light can turn on and off with commands from the processor.

The antenna 59 is shown, which can be connected to or in communication with the processor.

The wind turbine 171 is shown, which can connect to the power supply in the housing. Another alarm 38 is shown, which can be mounted to the pole and can be in communication with the processor and the power supply.

The radar transmitter/receiver 444 for providing ground radar detection and monitoring is shown. The radar transmitter/receiver can connect to the processor and the power supply.

In addition, it should be understood that embodiments include hardware, software, and electrical components or modules that, for purposes of discussion, can be illustrated and described as if the majority of the components were implemented solely in hardware. However, one of ordinary skill in the art, and based on a reading of this detailed description, would recognize that, in at least one embodiment, the electronic based aspects of the embodiments may be implemented in software. As such, it should be noted that a plurality of hardware and software based devices, as well as a plurality of different structural components may be utilized to implement the embodiments. Furthermore, and as described in previous paragraphs, the specific mechanical configurations illustrated in the drawings are intended to exemplify embodiments and that other alternative mechanical configurations are possible.

While these embodiments have been described with emphasis on the embodiments, it should be understood that within the scope of the appended claims, the embodiments might be practiced other than as specifically described herein.

What is claimed is:

1. A self-contained portable unit with an integral automated unmanned computer operated asset control system and an integral access/egress system providing bidirectional communication with a network and forming a tracking report, the self-contained portable unit comprising:
   a. a housing integral with a base;
   b. a processor with a data storage contained inside the housing connected to a power supply, the processor in communication with the network;
   c. at least one access prevention device physically mounted to the housing or to the base, wherein the at least one access prevention device is electrically connected to the power supply and electronically connected to the processor, further wherein the at least one access prevention device automatedly opens and closes, thereby allowing or preventing ingress or egress past the housing by at least one of: a radio frequency identification tagged asset with a radio frequency identification tag, a moveable element without the radio frequency identification tag, and a moveable element with the radio frequency identification tag;
   d. the automated unmanned computer operated asset control system comprising: at least one camera mounted on the housing or to the base electrically connected to the power supply and in communication with the processor, wherein the automated unmanned computer operated asset control system simultaneously:
      (i) controls movement of the radio frequency identification tagged asset or the moveable element with the radio frequency identification tag from a perimeter area;
      (ii) verifies location of the radio frequency identification tagged asset or the moveable element with the radio frequency identification tag in the perimeter area;
      (iii) generates the tracking report on the movement and location of the radio frequency identification tagged asset or the moveable element with the radio frequency identification tag into or from the perimeter area, wherein the automated unmanned computer operated asset control system further comprises:
         (1) a library of radio frequency identification tags in the data storage, the library of radio frequency identification tags having a plurality of radio frequency identification tags, each radio frequency identification tag having a radio frequency identification identifier and tagged asset specification;
         (2) a radio frequency identification transmitter/receiver in the housing or mounted to the housing in communication with the processor and electrically connected to the power supply, the radio frequency identification transmitter/receiver configured to transmit the radio frequency identification identifiers from the radio frequency identification tag on the radio frequency identification tagged asset to the processor when the radio frequency identification tagged asset moves past the radio frequency identification transmitter/receiver; and
         (3) computer instructions in the data storage to instruct the processor to:
            a) compare the transmitted radio frequency identification identifier to the library of radio frequency identification tags in the data storage; and
            b) generate the tracking report for the transmitted radio frequency identification identifier, wherein the tracking report provides a date and the radio frequency identification identifier for the radio frequency identification tagged asset or the moveable element with the radio frequency identification tag; and
      (iv) positions the at least one camera to target at least one of:
         (1) an entry area to form an entry area recording of:
            a) movement of the radio frequency identification tagged asset or the moveable element with the radio frequency identification tag when the radio frequency identification transmitter/receiver identifies the radio frequency identification tagged asset; or
            b) a vehicle image lacking the radio frequency identification tag, capturing a vehicle license plate;
         (2) an exit area to form an exit area recording of:
            a) movement of the radio frequency identification tagged asset or the moveable element with the radio frequency identification tag when the radio frequency identification transmitter/receiver identifies the radio frequency identification tagged asset; or
            b) the vehicle image lacking the radio frequency identification tag, capturing the vehicle license plate; and (3) a perimeter area to form a perimeter area recording of:
  a) movement of the radio frequency identification tagged asset or the moveable element with the radio frequency identification tag when the radio frequency identification transmitter/receiver identifies the radio frequency identification tagged asset; or
  b) the vehicle image lacking the radio frequency identification tag, capturing the vehicle license plate;
e. the integral access/egress system comprising:
  (i) at least one log in/log out device mounted on the housing or the base, electrically connected to the power supply and in communication with the processor, wherein the at least one log in/log out device is configured to perform at least one of the following:
    (1) receive transmitted card information from a user seeking access to or exit from the perimeter area controlled by the self-contained portable unit;
    (2) receive transmitted biometric information from the user seeking access to or exit from the perimeter area controlled by the self-contained portable unit; and
    (3) receive a transmitted alpha/numeric code for the user seeking access to or exit from the perimeter area controlled by the self-contained portable unit;
  (ii) computer instructions in the data storage for license plate recognition, wherein license plate recognition occurs only when the vehicle license plate is captured, and further wherein the computer instructions are configured to instruct the processor to:
    a. match the vehicle license plate to license plate images in a library of license plates contained in the data storage;
    b. provide a command to the at least one access prevention device to automatedly prevent entry if the vehicle license plate does not match any of the license plate images in the library of license plates; and
    c. provide a command to the at least one access prevention device to automatedly provide entry if the vehicle license plate does match any of the license plate images in the library of license plates;
  (iii) computer instructions for card information matching in the data storage, wherein card information matching occurs only when transmitted card information is received, and further wherein the computer instructions instruct the processor to:
    a. match the transmitted card information to card information in a library of card information in the data storage;
    b. provide a command to the at least one access prevention device to automatedly prevent entry if the transmitted card information does not match any of the card information in the library of card information; and
    c. provide a command to the at least one access prevention device to automatedly provide entry if the transmitted card information does match any of the card information in the library of card information;
  (iv) computer instructions for biometric information matching in the data storage, wherein biometric information matching occurs only when transmitted biometric information is received, and further wherein the computer instructions instruct the processor to:
    a. match transmitted biometric information from the at least one log in/log out device to biometric information in a library of biometric information in the data storage;
    b. provide a command to the at least one access prevention device to automatedly prevent entry if the transmitted biometric information does not match any of the biometric information in the library of biometric information; and
    c. provide a command to the at least one access prevention device to automatedly provide entry if the transmitted biometric information does match any of the biometric information in the library of biometric information;
  (v) computer instructions for alpha/numeric code matching in the data storage, wherein alpha/numeric code matching occurs only when transmitted alpha/numeric codes are received, and further wherein the computer instructions instruct the processor to:
    a. match a transmitted alpha/numeric code from the at least one log in/log out device to alpha numeric codes in a library of alpha/numeric codes in the data storage;
    b. provide a command to the at least one access prevention device to automatedly prevent entry if the transmitted alpha/numeric code does not match any of the alpha/numeric codes in the library of alpha/ numeric codes; and
    c. provide a command to the at least one access prevention device to automatedly provide entry if the alpha/numeric code does match any of the alpha/ numeric codes in the library of alpha/numeric codes; and
  while automatedly supplementing the tracking report with information on the matching of the license plate image, the card information, the biometric information, and the alpha/numeric code, for the radio frequency identification tagged assets in the perimeter area.

2. The system of claim 1, further comprising an antenna affixed to the housing and in communication with the radio frequency identification transmitter/receiver, the processor, and the network and connected to the power supply.

3. The system of claim 1, wherein the at least one camera provides at least one of: video images, infrared images, still images, or combinations thereof.

4. The system of claim 1, wherein the at least one log in/log out device is a card reader, a biometric information reader, an alpha/numeric keypad, or combinations thereof.

5. The system of claim 1, wherein the processor is a plurality of processors.

6. The system of claim 1, wherein the base is a skid undercarriage or a wheeled frame.

7. The system of claim 1, wherein the at least one access prevention device is a closable/openable sliding gate, a rolling fence, a sliding wall, a rigid bollard, a folding bollard, a popup bollard, a drop arm gate, or combinations thereof.

8. The system of claim 1, wherein the network is a cellular network, a satellite network, a global communication network, a fiber optic network, a wide area network, a local area network or combinations thereof.

9. The system of claim 1, wherein the processor is a computer, a laptop, a tablet computer, a cellular phone, or a plurality of computers.

10. The system of claim 4, wherein the at least one log in/log out device is configured for receiving input from at least one of: a chip card, a proximity card, a magnetic card, and a biometric source including retinal images, fingerprint images, voice prints, and hand geometry scans.

11. The system of claim 1, wherein the power supply is onboard the base or in the housing and the power supply comprises: at least one battery, a wind turbine, a solar panel, a generator, or combinations thereof.

12. The system of claim 1, comprising at least one alarm connected to the processor and the power supply, and computer instructions in the data storage for instructing the processor to provide a visual or an audible alarm if the vehicle license plate does not match any of the license plate images in the library of license plates, transmitted card information does not match any of the card information in the library of card information, transmitted biometric information does not match any of the biometric information in the library of biometric information, transmitted alpha/numeric code does not match any of the alpha/numeric codes in the library of alpha/numeric codes, or when the at least one camera records unauthorized movement out of the perimeter area or into the perimeter area, wherein the perimeter area contains the radio frequency identification tagged asset, the moveable element with the radio frequency identification tag, or the moveable element without the radio frequency identification tag.

13. The system of claim 1, further comprising a motion sensor antitheft device mounted to the housing or the base for automatedly providing a message using the network when the housing with the base is moved.

14. The system of claim 1, wherein the housing further comprises an environmental control unit connected to the power supply and the processor, the environmental control unit is for climate control monitoring and management within the housing.

15. The system of claim 1, wherein the radio frequency identification tagged asset, the moveable element with the radio frequency identification tag, or the moveable element without the radio frequency identification tag is a piece of equipment, an animal, or a vehicle.

16. The system of claim 1, wherein the tagged asset specification includes: an age, a manufacturer name, an owner name, a date of last repair, a cost to procure, and materials of manufacture for inclusion in the tracking report.

17. The system of claim 1, comprising an infrared transmitter/receiver connected to the processor and the power supply, and mounted to the housing, the infrared transmitter/receiver configured to provide a plurality of infrared beams contacting an infrared reflector forming an infrared fence and transmit an alarm to the processor when at least one of the infrared beams of the infrared fence is broken.

18. The system of claim 1, comprising a radar transmitters/receiver connected to the processor and the power supply, and mounted to the housing, the radar transmitter/receiver configured to provide pings towards the ground for detecting and tracking any object in the vicinity of the housing and the base, and transmit an alarm to the processor if any object enters all or a portion of the perimeter area.

19. The system of claim 1, comprising computer instructions for instructing the processor to transmit the tracking report from the processor to the network and to at least one client device connected to the network for remote monitoring.

* * * * *